United States Patent [19]
Kageyama et al.

[11] Patent Number: 5,303,336
[45] Date of Patent: Apr. 12, 1994

[54] PRINTING SYSTEM INCLUDING PRINT SERVER

[75] Inventors: Seiji Kageyama; Keiichi Nakane, both of Yokohama; Chikahiko Nagata, Hadano, all of Japan

[73] Assignee: Hitachi, Ltd., Tokyo, Japan

[21] Appl. No.: 4,496

[22] Filed: Jan. 14, 1993

Related U.S. Application Data

[63] Continuation of Ser. No. 699,660, May 14, 1991.

[30] Foreign Application Priority Data

May 14, 1990 [JP] Japan .................. 2-123782

[51] Int. Cl.⁵ .............................. G06F 15/00
[52] U.S. Cl. .................... 395/114; 395/112
[58] Field of Search ............. 395/101, 112, 114, 325, 395/500; 358/442, 467; 400/61, 76; 346/154, 157

[56] References Cited

U.S. PATENT DOCUMENTS

| 4,992,957 | 2/1991 | Aoyama et al. | 395/114 |
| 5,047,957 | 9/1991 | Ikenoue | 395/114 |

FOREIGN PATENT DOCUMENTS

| 62-73831 | 4/1987 | Japan | H04L 11/00 |
| 62-274331 | 11/1987 | Japan | G06F 3/12 |
| 63-75828 | 4/1988 | Japan | G06F 3/12 |
| 63-99644 | 4/1988 | Japan | H04L 11/00 |
| 63-250730 | 10/1988 | Japan | G06F 3/12 |
| 63-288318 | 11/1988 | Japan | G06F 3/12 |

Primary Examiner—Arthur G. Evans
Attorney, Agent, or Firm—Antonelli, Terry, Stout & Kraus

[57] ABSTRACT

A printing system in which a plurality of terminals for creating document data with different printing protocols or character codes, the document data including a string of printing commands, are connected to a print server for printing the document data via a network. Each terminal includes a device adding an identifier indicating a printing protocol or character code of the document data to be sent to the print server. The print server includes a converter for converting the different printing protocols or character codes into a common printing protocol or a common set of character codes according to the identifier. The print server may includes a memory for storing command processing programs associated with the different printing protocols or different sets of character codes and a switcher for selecting one command processing program or one set of character codes according to the identifier.

11 Claims, 9 Drawing Sheets

| NO. | MULTI-PRINTING PROTOCOL SWITCHING CONTROL | | MULTIPLE PRINT PROTOCOL SUPPORT ABILITY | COMMAND PROCESSING PROGRAM TOTAL CAPACITY | SWITCHING TIME | COMMAND PROCESS TIME AFTER SWITCHING |
|---|---|---|---|---|---|---|
| | NAME | CONTENT | | | | |
| (i) | EXCHANGE OF COMMAND PROCESSING PROGRAMS | COMMAND PROCESSING PROGRAMS ARE EXCHANGED BASED ON PRINTING PROTOCOLS. | ○ | △ | △ | ○ |
| (ii) | CONVERSION OF COMMANDS | PRINTING COMMANDS ARE CONVERTED INTO COMMON COMMANDS, AND ARE PROCESSED. | △ | ○ | ○ | △ |
| (iii) | EXCHANGE OF UNCOMMON PARTS OF PROGRAMS | COMMAND PROCESSING PROGRAMS ARE EXCHANGED ONLY FOR UNCOMMON PARTS THEREOF. | ○ | ○ | △ | ○ |

PRINTING SYSTEM INCLUDING PRINT SERVER

This application is a continuation of application Ser. No. 699,660, filed on May 14, 1991.

BACKGROUND OF THE INVENTION

1. Field of the Invention

The present invention relates to a printing system including a print server to be shared by a plurality of workstations, personal computers or the like.

2. Description of the Related Art

Recently, in a field of a workstation, a personal computer or the like, a LAN (Local Area Network) or a WAN (Wide Area Network) has been widely used. With the spread of the LAN or WAN, a print server to be shared by a plurality of terminals such as workstations, personal computers, word processors is advantageously employed for saving an introduction cost and installation space.

Figure 1:
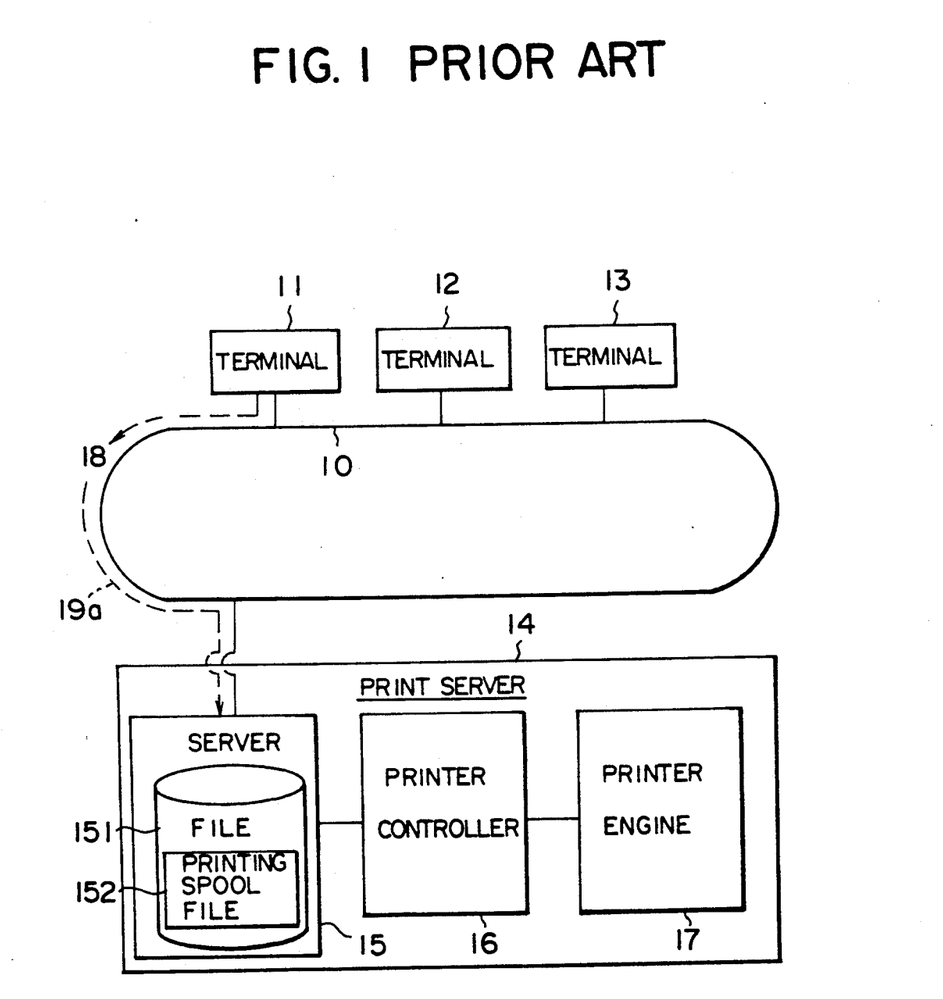
FIG. 1 is a block diagram of a conventional printing system.

Referring to FIG. 1, there is shown a conventional printing system comprising a network 10 such as a LAN or WAN, first, second and Nth terminals 11, 12 and 13 connected to the network 10 and a print server 14 connected to the network 10, the print server 14 including a server 15, a printer controller 16 and a printer engine 17. In this printing system, printing is carried out in the following. (1) Each of the terminals 11 to 13 transmits document data 18 for representing a printing content of a document to the server 15 of the print server 14 through a path 19a of the network 10. The document data 18 comprises a string of printing commands for describing the printing content such as characters, graphics, images and so forth for each page of the document. (2) The print server 14 processes the document data as follows:

(a) Firstly, the server 15 once stores the document data 18 in a printing spool file part 152 within a file 151 of the server 15.

(b) Secondly, the server 15 reads the document data out of the printing spool file portion 152 and transmits the document data to the printer controller 16 to instruct printing of the document.

(c) The printer controller 16 processes the received document data and gives an instruction for printing the document to the printer engine 17.

(d) Finally, the printer engine 17 carries out an electrophotographic printing process or a wire dot printing process according to the instruction output from the printer controller 16 to print the document on the sheets of paper.

The conventional printing systems are disclosed in, for example, Japanese Patent Laid-Open Publication (KOKAI) Nos. 62-274331, 63-75828, 63-99644 and 63-250730.

In the conventional printing systems, since no consideration is taken (i) for sharing the print server among different kinds of terminals and (ii) for sharing the print server in case of different kinds of printing protocols used for describing the document data even when the kind of the terminals is the same, a print server is difficult to be used in common.

Conventionally, in order to overcome such problems, it is necessary to provide different print servers for dealing with the different kinds of terminals or different kinds of printing protocols, which requires much cost and gives only small performance with reference to the invested cost.

Further, in a conventional server system disclosed in Japanese Patent Laid-Open Publication (KOKAI) No. 63-75828, printing data sent from terminals are converted into another type of data adapting to the printer type of the server system. In this case, a plurality of terminals have the same data printing format, and thus this server system can not cope with the different kinds of printers nor different kinds of printing protocols.

SUMMARY OF THE INVENTION

Accordingly, it is an object of the present invention to provide a printing system, free from the problems of the prior art, which is capable of dealing with different kinds of terminals and different kinds of printing protocols by a single print server, giving a high cost performance, and supporting a plurality of printing protocols and different kinds of terminals.

In accordance with one aspect of the present invention, there is provided a printing system having a plurality of terminals and a print server connected via a network to the plurality of terminals such that the print server is shared by the plurality of terminals to print document data including a string of printing commands produced by the terminals, the printing system characterized in that each of the plurality of terminals is provided with means for adding an identifier to the document data to be supplied to the print server, the identifier identifying a type of printing protocol thereof, and that the print server is provided with means responsive to the identifiers for converting different printing protocols of the plurality of terminals into a common printing protocol.

In accordance with another aspect of the present invention, there is provided a printing system having a plurality of terminals and a print server connected via a network to the plurality of terminals such that the print server is shared by the plurality of terminals to print document data including a string of printing commands produced by the terminals, the printing system characterized in that each of the plurality of terminals is provided with means for adding an identifier to the document data to be supplied to the print server, the identifier identifying a type of printing protocol thereof, and that the print server is provided with means for storing a plurality of command processing programs associated with different printing protocols of the plurality of terminals and means responsive to one of the identifiers for selecting an associated one of the plurality of command processing programs.

In this printing system, a part of the command processing program usable in common for the different printing protocols may be used in common.

Further, the print server means may include a secondary memory for storing the command processing programs corresponding to the different printing protocols, and a main memory for storing the command processing program read out of the secondary memory according to the identifier.

In accordance with a further aspect of the present invention, there is provided a printing system having a plurality of terminals and a print server connected via a network to the plurality of terminals such that the print server is shared by the plurality of terminals to print document data including a string of printing commands produced by the terminals, the printing system characterized in that each of the plurality of terminals is provided with means for adding an identifier to the document data to be supplied to the print server, the identifier identifying a type of printing protocol thereof, and that the print server is provided with a plurality of command conversion means for converting command sets associated with different printing protocols of the plurality of terminals into a common command set and selection means for selecting one of the plurality of command conversion means in response to the identifier added to the document data which is received from one of the terminals.

The print server may include a server having a file part for storing document data received from said plurality of terminals, a printer controller for processing the printing commands of the document data received from said server, and a printer engine for carrying out printing in response to an instruction from the printer controller, the printer controller including a secondary memory for storing a plurality of font sets and a primary memory for storing necessary ones of the plurality of font sets.

Further, the print server may include a server having a file part for storing document data received from said plurality of terminals, a printer controller for processing the printing commands of the document data received from said server, and a printer engine for carrying out printing in response to an instruction from the printer controller, a secondary memory being provided in said server for storing both plurality of command processing programs and a plurality of font sets such that the printer controller is allowed to receive from said server one of the plurality of command processing programs and one of the plurality of font sets.

In accordance with the above described aspects of the present invention, character codes may apply to them instead of the printing protocols.

In operation of a typical printing system of the present invention, after creation of document data in the document data formation part, each terminal transmits the document data via a server communication part in the terminal to a server.

Upon receipt of the document data from the terminal, the server stores the document data in a print spool file part in a data format combining a printing protocol identifier and a string of printing commands. Then, the server sequentially reads document data out of the print spool file part and transmits the data via a print controller communication part to the printer controller.

The printer controller processes the document data received from the server as follows:

(1) An identifier at the head of the document data is discriminated by a printing protocol discrimination part.

(2) One of the command processing programs is selected according to the discriminated new printing protocol by a printing protocol switching part.

(3) A string of printing commands in the document data written according to the printing protocol are processed and then a printer engine is activated.

Thus, even if a plurality of types of terminals issue requests of printing documents written in various types of printing protocols to the print server, the print server can accept all the document data and perform command processing based on the given printing protocol, thereby providing a printing system with a high cost performance.

BRIEF DESCRIPTION OF THE DRAWINGS

The above and other objects, features and advantages of the present invention will more fully appear from the following description of the preferred embodiments with reference to the accompanying drawings, in which.

DESCRIPTION OF THE PREFERRED EMBODIMENTS

Figure 2A:
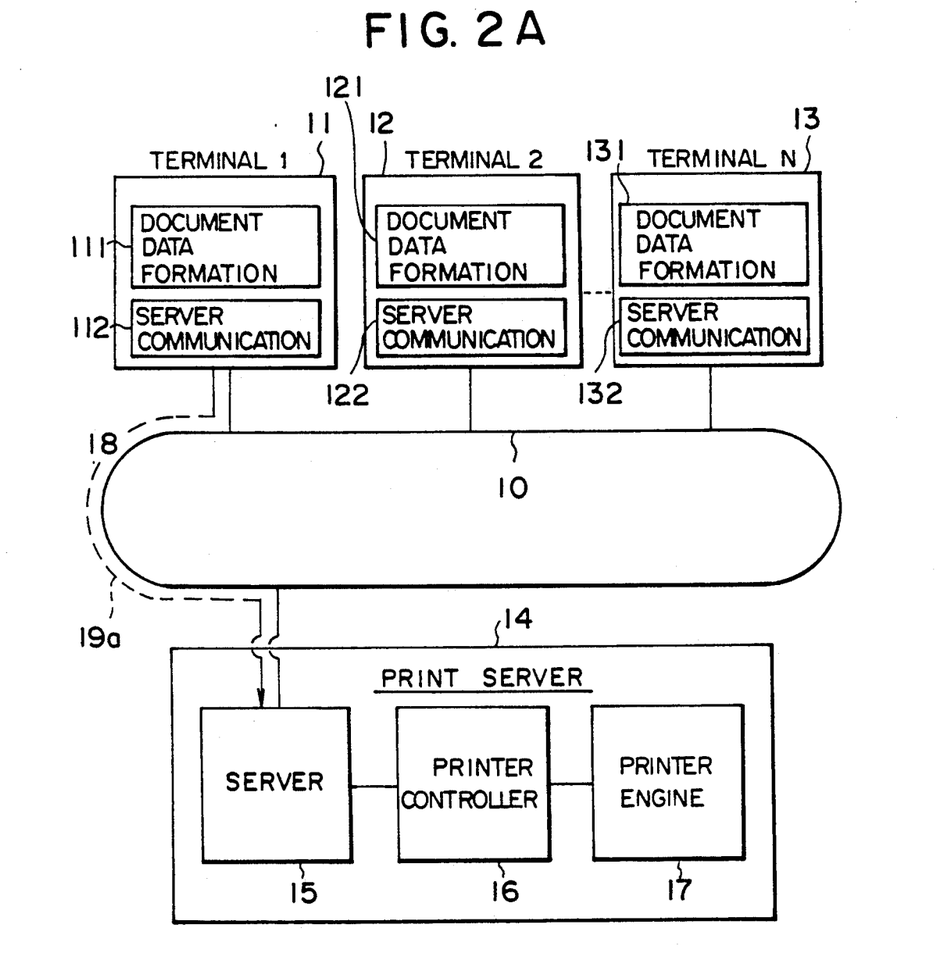
FIG. 2A is a block diagram of a first embodiment of a printing system according to the present invention.
Figure 2B:
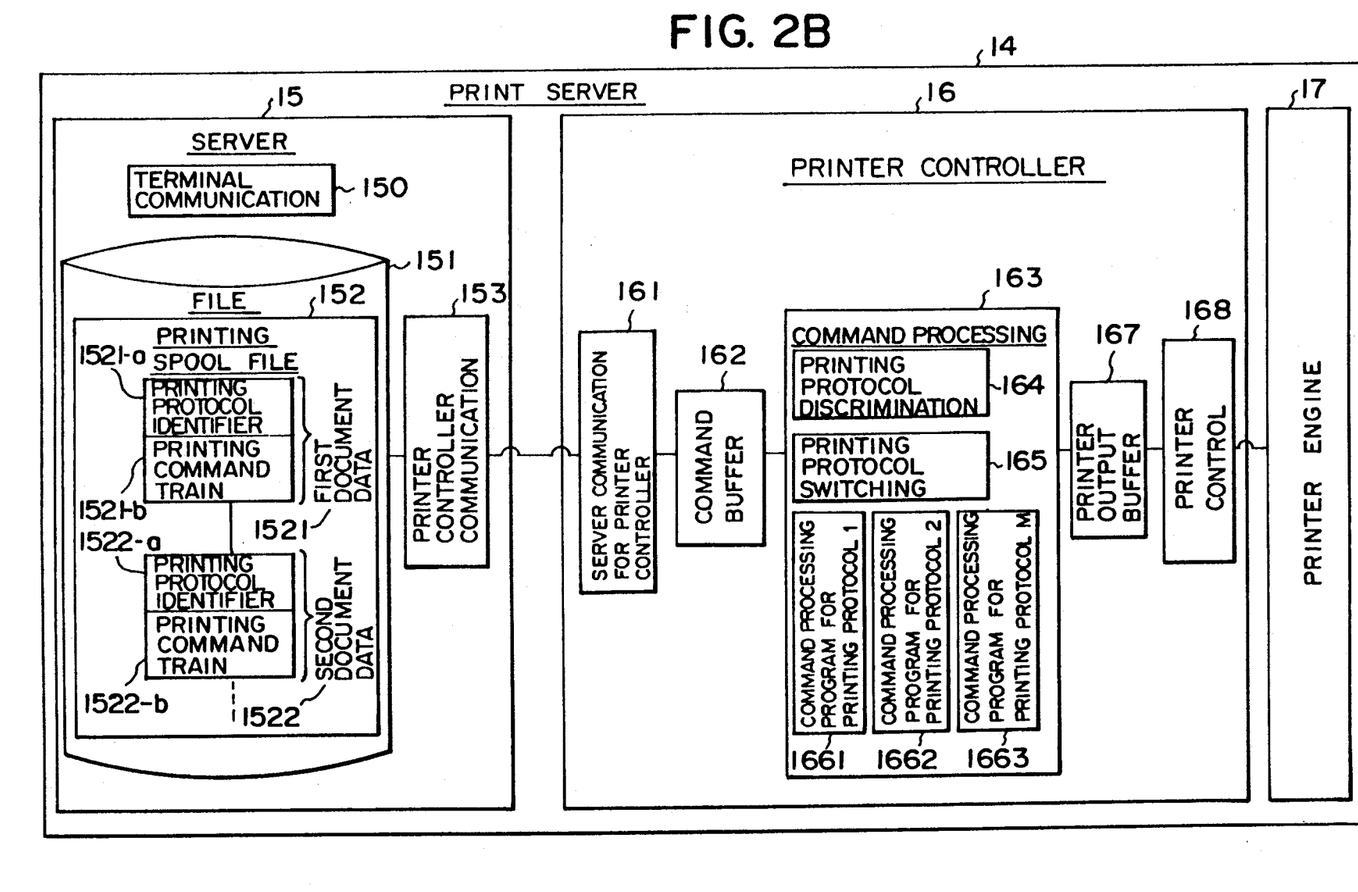
FIG. 2B is a block diagram of a print server shown in FIG. 2A.

Referring now to the drawings, wherein like reference characters designate like or corresponding parts throughout the several views and thus the repeated description thereof will be omitted for the brevity, there is schematically shown in FIGS. 2A and 2B the first embodiment of a printing system according to the present invention.

In the drawings, the printing system comprises a network 10 such as a LAN or WAN, first, second, . . . and Nth terminals 11, 12 and 13, such as workstations, personal computers or word processors, capable of communicating with each other through the network 10, and a print server 14 to be used in common by the terminals 11, 12 and 13, the print server 14 also being connected to the network 10.

Each terminal 11, 12 or 13 includes a document data formation part 111, 121 or 131 for forming document data 18 composed of a printing protocol identifier and a string of printing commands and a server communication part 112, 122 or 132 for transmitting the document data 18 to the print server 14.

The print server 14 includes a server 15, a printer controller 16 and a printer engine 17. The server 15 includes a terminal communication part 150 for receiving the document data 18, a file part 151 for storing various files therein, including a printing spool file part 152 for temporarily storing the received document data as first, second and following document data 1521, 1522, . . . composed of combinations of print protocol identifier 1521a, 1522a, . . . and printing commands 1521b, 1522b, . . ., respectively, and a printer controller communication part 153 for transmitting the document data 1521, 1522, . . . stored in the printing spool file part 152 to the printer controller 16.

The printer controller 16 includes a server communication part 161 for receiving the document data from the server 15, a command buffer part 162, a command processing part 163, a printer output buffer part 167 and a printer control part 168. The command processing part 163 includes a printing protocol discrimination part 164 for discriminating the printing protocol identifiers, a printing protocol switching part 165, and first, second to Nth command processing programs 1661, 1662 to 1663 respectively for first, second to Mth printing protocols. The printing protocol switching part 165 switches to select one of first, second to Mth command processing programs 1661, 1662 to 1663 respectively for first, second to Nth printing protocols according to the discrimination result of the printing protocol discrimination part 164.

In this printing system, a printing is carried out in the following procedures. Each of the terminals 11 to 13 transmits document data 18 for representing the content of a document to the server 15 of the print server 14 through a path 19a of the network 10. The print server 14 processes the document data as follows:

(1) As shown in FIG. 2B, the server 15 temporarily stores the document data 18 in the printing spool file part 152 within the file part 151 of the server 15.

(2) The server 15 reads out the document data of the printing spool file part 152 and transmits the document data to the printer controller 16 to instruct a printing of the document.

(3) The printer controller 16 processes the received document data and gives an instruction for printing the document to the printer engine 17.

(4) The printer engine 17 carries out an electrophotographic printing process or a wire dot printing process according to the instruction outputted from the printer controller 16 to print the document on sheets of paper.

For instance, the first and second document data 1521, 1522 and so forth stored in the printing spool file part 152 in the server 15 are read out and transmitted via the printer controller communication part 153 to the printer controller 16. In the printer controller 16, the document data are received by the server communication part 161 and are stored in the command buffer part 162. The document data stored in the command buffer part 162 are then processed in the command processing part 163, and the results or printing data of characters, graphics, images and so forth are fed to the printer output buffer part 167 to be stored therein. The printer control part 168 reads out the printing data in the printer output buffer part 167 and converts the printing data into signals in a form to be receptible by the printer engine 17, and the converted signals are sent to the printer engine 17.

Now, the operation of the printing system of the present invention will be described with reference to the following two cases. Of course, the present invention can apply to other cases in the same manner as the two cases.

CASE 1: The first and second terminals 11 and 12 are of different kinds, and the printing protocols used in the first and second terminals 11 and 12 are first and second different protocols.

CASE 2: The first and second terminals 11 and 12 are of the same kinds, but the printing protocols used in the first and second terminals 11 and 12 are first and second different protocols.

The printing system having the terminals of different types or different printing protocols is allowed to share the print server 14 with the following features:

(a) Each of first, second and Nth terminal 11, 12 or 13 creates the document data composed of a combination of a printing protocol identifier and a string of printing commands described by the printing protocol by using the document data formation part 111, 121 or 131. Then, the created document data are transmitted to the print server 14 by the server communication part 112, 122 or 132. In this instance, each document data formation part 111, 121 or 131 is prepared appropriately depending on the type of terminal, the printing protocol and application programs for forming the printing content on the terminal.

(b) In the server 15, the terminal communication part 150 receives the document data transmitted from each terminal 11, 12 or 13, and the received document data are temporarily stored in the printing spool file part 152 in the above-described data format such as the combination of the printing protocol identifier and the string of printing commands.

(c) In the server 15, then, the document data 1521, 1522 and so forth are read out of the printing spool file part 152 in proper order and are transmitted to the printer controller 16 by the printer controller communication part 153. In this case, the reading out order and transmission order of the document data are determined in consideration of the receiving order from the terminals, paper sizes to be used for the document data, entire printing page numbers of document data, and so forth.

(d) In the printer controller 16, the server communication part 161 receives the document data 1521, 1522 and so forth, and the received data are temporarily stored in the command buffer part 162. Then, in the command processing part 163, the processing of the document data is carried out as follows:

(i) The printing protocol identifier 1521a or 1522a present at the head of the document data 1521 or 1522 is discriminated by the printing protocol discrimination part 164.

(ii) The printing protocol switching part 165 selects one of the command processing programs (the first or second Mth command processing program 1661, 1662, or 1663) corresponding to the first to Mth printing protocols according to the discriminated one of the printing protocols (i.e., the first, second, or Mth printing protocol).

(iii) The command processing part 163 processes the document data read out of the command buffer part 162 to carry out the interpretation and execution of the printing commands to obtain the printing data by using the selected command processing program.

The obtained printing data are sent to the printer output buffer part 167 and then are used for printing the document in the same manner as described above.

In this embodiment, by providing the printing spool file part 152 in the server 15, the following advantages can be obtained.

(1) Even when the printer controller 16 and the printer engine 17 are busy and occupied for and by other document data, as long as the space of the printing spool file part 152 is not fully occupied with, the server 15 can further receive the printing requests from one or more terminals and store the document data in the printing spool file part 152.

(2) Furthermore, the document data created by different kinds of terminals using different kinds of printing protocols can be received by the single server 15.

The first to Nth terminals 11, 12 and 13 request the server 15 to carry out the following services:

(i) Printing request of document data;

(ii) Interruption and continuation of printing of the requested document data;

(iii) Compulsory termination of the printing of the requested document data;

(iv) Inquiry of printing situation of the requested document data;

(v) Request of a report of finishing print from the server 15 to the terminal having requested the printing when detecting finish of the print; and (vi) Change of order of printing the requested document data in the printing spool file part 152.

In this embodiment, the first, second and other document data are connected in one printing queue regardless of the kinds of printing protocol.

Further, different printing queues may be provided for different kinds of terminals and printing protocols wherein document data are connected to the corresponding different printing queues. In this case, for example, the document data 1521, 1522 and so forth include the printing command string 1521b, 1522b and so forth but does not include the printing protocol identifiers 1521a, 1522a and so forth. However, as compared with the first printing queuing system, this queuing system has the following disadvantages.

(1) When a new kind of terminal or printing protocol is added, a new printing queue is required. Hence, for the increase of the new printing queue, excessive processing and time are required, and the control of the system is complicated.

(2) While almost no document data is connected to most of the printing queues, sometimes the maximum number of document data are connected to one particular printing queue, and further a lot of printing requests could rush to the printing queue. In such case, further printing requests must wait to be issued in the terminals and their users, degrading a printing throughput in the printing system.

(3) The printing requests issued from the terminals are received by a plurality of printing queues in a distributive manner, and hence it is difficult to give the printing instruction to the printer controller 16 in the received order from the terminals in the server 15. Even if possible, its processing and management are complicated.

(4) When the server 15 receives the printing requests issued from the terminals, the server must decade the printing protocol identifier of each document data from the terminals, and connects each document data to the printing queue, the king of which corresponds to the decoded printing protocol identifier.

(5) When document data in the printing queue are transmitted to the printer controller 16 to request the printing, the server 15 is required to check and transmit the kind of the printing queue to the printer controller 16 prior to the document data transmission.

(6) As described in (4) and (5), in the second printing queuing system, the server 15 is required to carry out processing and management depending on the kinds of the printing protocols. However, in the first printing queuing system, such processing and management are not required.

Figure 3:
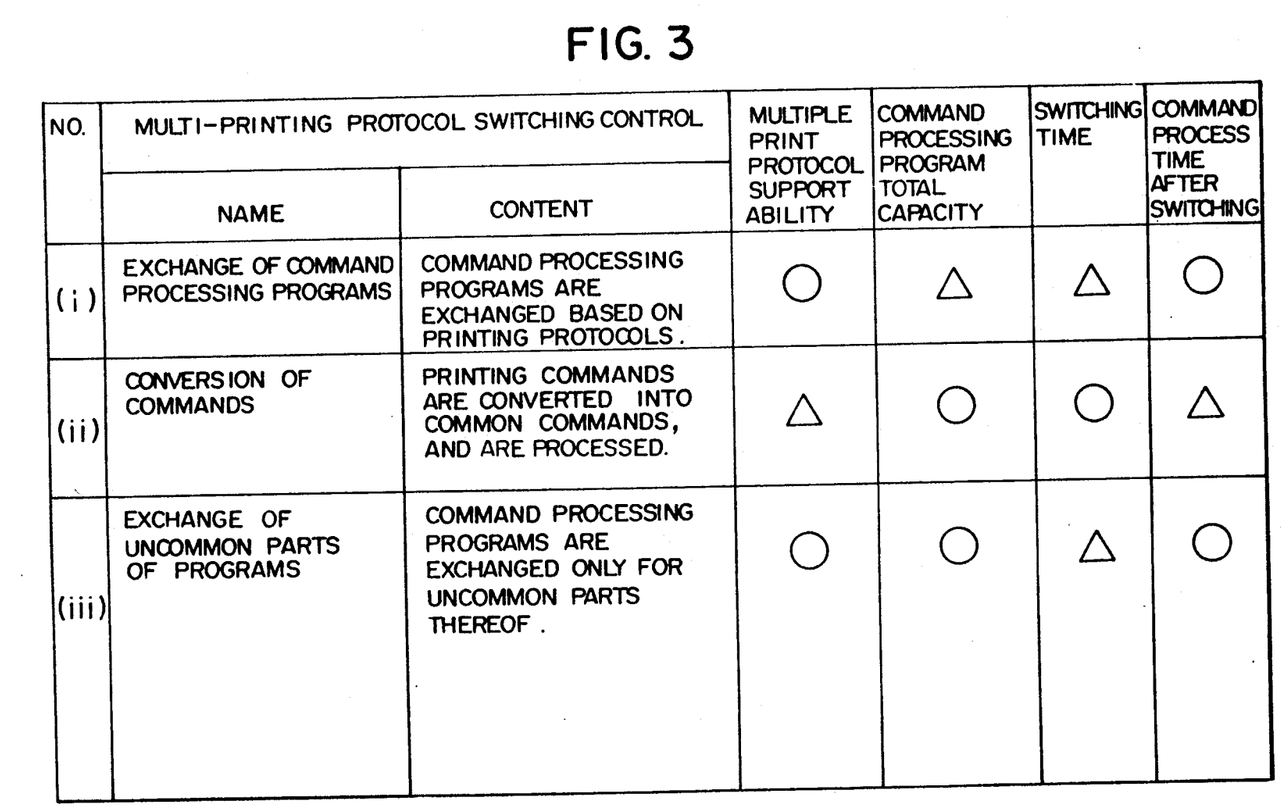
FIG. 3 is a schematic view for explaining a multi printing protocol switch control system used in the printing system shown in FIGS. 2A and 2B.

In this embodiment, as shown in FIG. 3, there are three approaches for switching a plurality of printing protocols while receiving a plurality of different kinds of printing protocols, and for processing the associated document data in the printer controller 16.

(i) APPROACH 1: Exchange system of command processing programs corresponding to the protocols.

(ii) APPROACH 2: Command conversion system.

(iii) APPROACH 3: Exchange system of uncommon program parts for command interpretation and the like.

In the APPROACH 1, the command processing programs for the different printing protocols are provided in the printer controller 16 or the server 15 in advance, and, when the printing protocol discrimination part 164 detects that the printing protocol has been changed, one of the command processing programs is selected which is corresponding to the printing protocol. The above-described embodiment mainly employs this approach.

In the APPROACH 2, the command interpretation associated with the printing protocol is carried out in the command processing part 163, and, after the printing commands in the document data are converted into common commands, the obtained common commands are executed. Hence, in this case, command conversion tables or command conversion programs corresponding to the different printing protocols are prepared, and the command conversion is carried out by using the command conversion tables or programs.

In the APPROACH 3 which is a variation of APPROACH 1, a command interpretation part and an uncommon drawing processing part are provided for each printing protocol exchangeably depending on a selected changed printing protocol, while using a common drawing processing part usable in common with no change.

In the APPROACH 2, when the command system of each printing protocol is different from that of the common commands, the conversion from the printing commands to the common commands is sometimes impossible. Even in such a case, many printing protocols can be dealt with this problem by adding the commands difficult to convert to the common commands.

However, when there exist a large difference between the command system of the common commands and the command system of each printing protocol, for instance, one command system having escape sequence commands for printer control and the other having a page descriptive language such as the Post Script or the like, the conversion is quite difficult. Even it is possible the command conversion tables or programs become complicated, and it takes a long time (included in the command processing time after the switching (conversion) in FIG. 3) for the command conversion.

On the other hand, in the APPROACHes 1 and 3, since a command processing program, that is, a command interpretation part and a drawing processing part corresponding to each printing protocol are provided, any printing protocol can be dealt with.

Accordingly, a multiple print protocol support ability is good (O) in the APPROACHes 1 and 3, but is sometimes disadvantageous (Δ) in the APPROACH 2, as shown in FIG. 3. Hence, the APPROACH 2 is used for the printing protocols within a safe range where the above-described inconvenience does not happen.

As described above, in this embodiment, even when a plurality of terminals of different kinds create document data by using different printing protocols and request the printing of the document data to a single print server having a printer controller, the printer controller discriminates the kind of printing protocol of the received document data and carries out appropriate command processings corresponding to the printing protocol to perform the printing of the document. Therefore, a printing system having a high performance with request to an invested cost can be provided.

Figure 4:
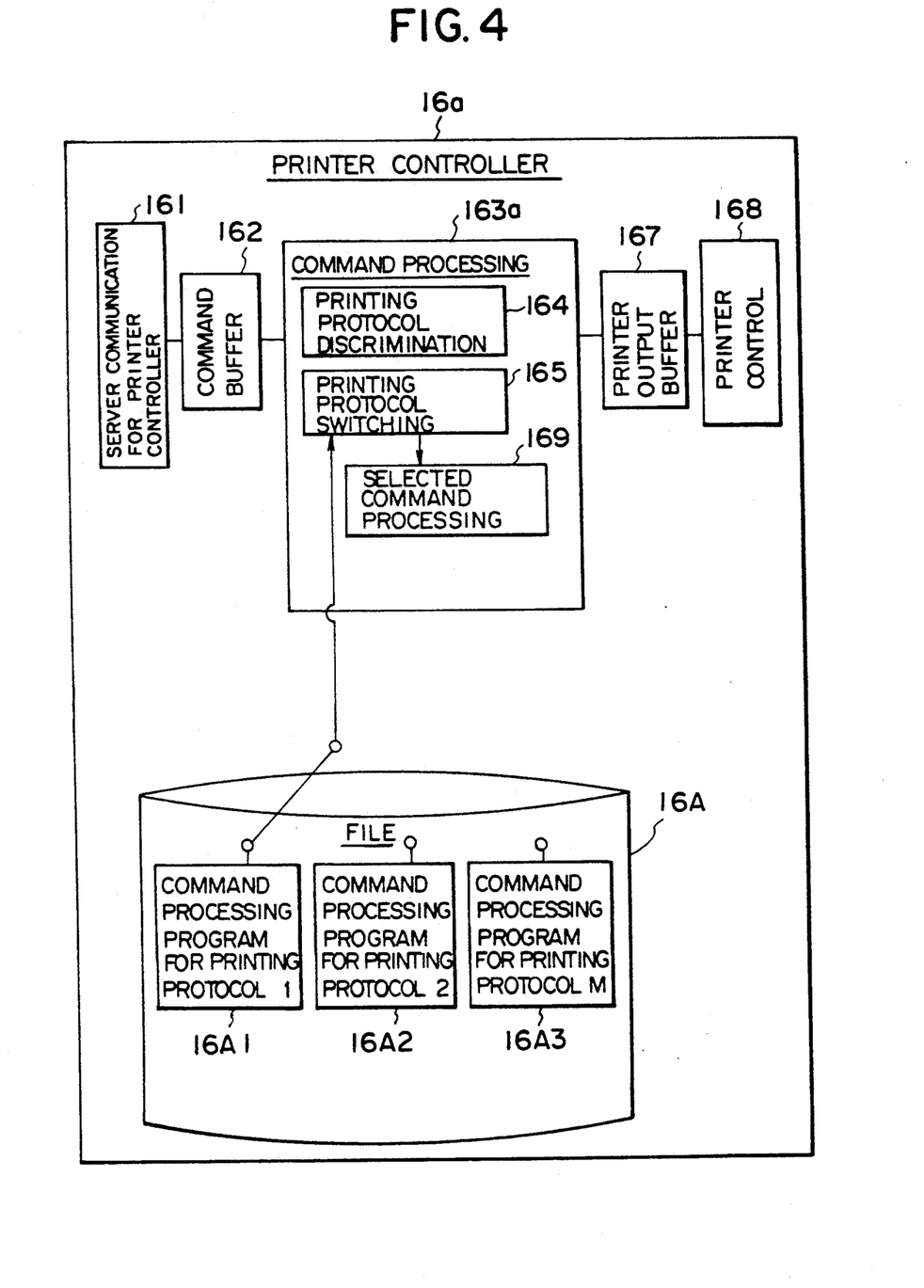
FIG. 4 is a block diagram of another embodiment of a printer controller of a second embodiment of a printing system according to the present invention.

Next, a second embodiment of a printing system according to the present invention, having the same structure as that of the first embodiment except a printer controller, will now be described in detail. In FIG. 4, there is shown another embodiment of a printer controller 16a of a print server in the printing system.

In the above-described first embodiment, since the first, second and Mth command processing programs 1661, 1662 and 1663 for the first, second and Mth printing protocols are resident in a main memory (primary memory), in order to support many (M) printing protocols, the memory capacity occupied in the main memory increases. For example, assuming that capacity of one command processing program for one printing protocol is 256 KB (kilobyte) and M is ten, a capacity of 2560 KB is required for the M command processing programs Since only one printing protocol is used for printing one document at a time, it is unnecessary to allow to be resident all of M command processing programs in the main memory.

In this embodiment, the printer controller 16a has the same structure as the printer controller 16 of the first embodiment, except that the following structure in order to overcome the capacity increase of the first embodiment due to the many command processing programs.

The printer controller 16a is further provided with a file part 16A (secondary memory) for storing first, second to Mth command processing programs 16A1, 16A2 to 16A3, in place of the first, second to Mth command processing programs 1661, 1662 to 1663 stored in the command processing part 163 in the first embodiment, and also provided with a selected command processing part 169 in a command processing part 163a.

Further, only one command processing program corresponding to a selected printing protocol is stored in the selected command processing part 169 to save the occupied space of the main memory.

As a result, even when the M (=10) printing protocols are supported, the main memory area for storing the command processing program can readily be provided by forming the selected command processing part 169 having a capacity for storing only one command processing program, that is, only 256 KB is sufficient in the above-described case.

In this embodiment, a server communication part 161, a command buffer part 162, a printing protocol discrimination part 164, a printing protocol switching part 165, a printer output buffer part 167 and a printer control part 168 have the same constructions as those of the first embodiment shown in FIG. 2B, and thus the description thereof can be omitted for brevity.

In this case, the switching of the printing protocols is carried out as follows:

(1) The printing protocol identifier 1521a or 1522a present at the head of the document data 1521 or 1522 is discriminated by the printing protocol discrimination part 164.

(2) On detecting that the printing protocol is changed to new one, the command processing part 163a activates the printing protocol switching part 165.

(3) The printing protocol switching part 165 reads out one of the command processing programs 16A1, 16A2 to 16A3 stored in the file part 16A according to the changed printing protocol and loads the selected one of the command processing programs in the selected command processing part 169.

(4) After the printing protocol switching part 165 completes its process, the command processing part 163a processes the document data read out of the command buffer part 162 to carry out the interpretation and execution of the printing commands by using the selected command processing program loaded in the selected command processing part 169. The printing data thus obtained are sent to the printer output buffer part 167 and then are used for printing the document in the same manner as described above.

Then, in order to improve the printing throughput in the print server, the printer output buffer part 167 is constructed as a page buffer memory capable of storing a plurality of pages of data, and a pipeline processing can be employed as to receiving the document data from the server 15, drawing the printing data on the page buffer memory in the printer output buffer part 167 by the command processing part 163a and issuing printing instructions of the printing data stored in the page buffer memory to the printer engine 17 through the printer control part 168.

The pipeline processing is disclosed in Japanese Patent Laid-Open Publication (KOKAI) Nos. 63-158481 and 1-164637.

In this embodiment, the above-described pipeline processing is applied to a drawing task and a printing task in the command processing part 163a as follows:

(1) The drawing task:

The drawing process for one page of data into one page buffer memory in the printer output buffer part 167 is carried out until a page end condition such as a page break or the like is detected. When the page end condition is detected, the drawing for the page is completed, and a printing task is started for the page of data stored in the one page buffer.

(2) The printing task:

A printing instruction for the one page of the printing data stored in the page buffer is given to the printer engine 17 through the printer control part 168.

If the printing protocol has changed, a previous or first drawing task for a previous or first printing protocol is changed to a new or second drawing task for a new or second printing protocol. This process is shown by a PAD (problem analysis diagram) in FIG. 5.

Figure 5:
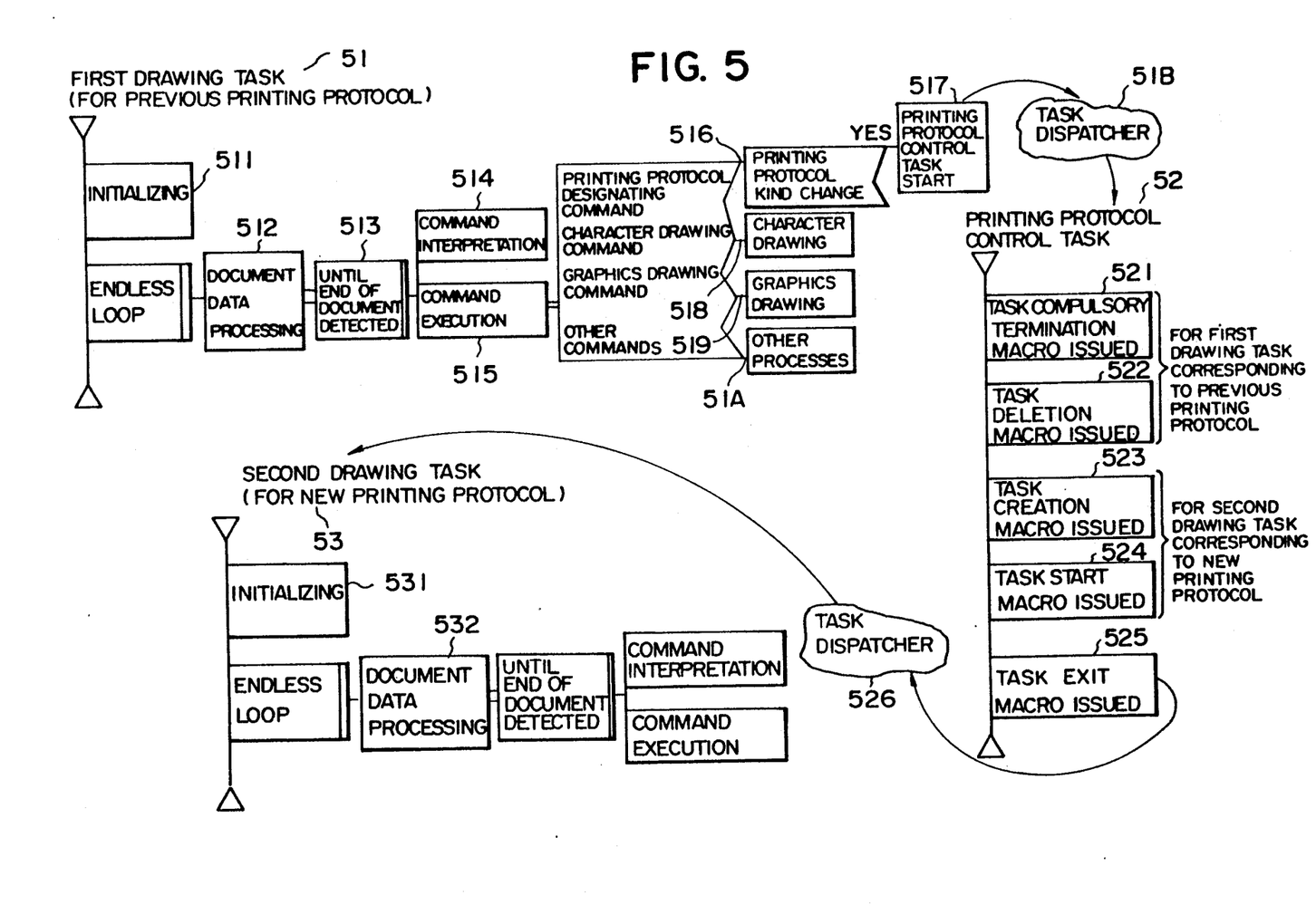
FIG. 5 is a schematic view for explaining a printing protocol switch control process in the printing system shown in FIG. 3.

As shown in FIG. 5, in the previous or first drawing task 51, for example, the first process for the previous or first printing protocol is carried out, as described above.

In the first drawing task 51, after initializing various parameters at a step 511, a document data process 512 is repeated. In the document data process 512, a command interpretation 514 and a command execution 515 are repeated until a document end detection 513. In this case, the printing protocol identifiers 152a, 1522a and the like within the document data are dealt with as commands (referred to as printing protocol designation commands in FIG. 5) similar to the other printing commands.

Depending on the results of the command interpretation 514, the process is carried out as follows:

(a) If the command is a printing protocol designation command 516, it is checked whether or not the printing protocol is changed, and, when the printing protocol is changed, a printing protocol control task for switching the printing protocol is started in step 517.

(b) If the command is a character drawing command 518, a character drawing process is performed.

(c) If the command is a graphics drawing command 519, graphics drawing process is performed.

(d) If the command is one of the other commands 51A, other processes corresponding to the other commands 51A are executed.

After starting of the printing protocol control task 517, the process is moved to a task dispatcher 51B, and the task dispatcher 51B selects the above-described printing protocol control task 52 as a task to be executed next and starts this process.

The printing protocol control task 52 first issues a task compulsory termination macro 521 and a task deletion macro 522 to the drawing task for the previous printing protocol to delete the program for the previous drawing task 51 from the selected command processing part 169.

Then, in the printing protocol control task 52, as to a new printing protocol drawing task, a task creation macro 523 and a task start macro 524 are issued. Thus, another command processing program 16A1, 16A2 or 16A3 for the new printing protocol is read out of the file part 16A, is loaded to the selected command processing part 169, and is started as a new or second drawing task 53.

In the printing protocol control task 52, a task exit macro 525 is issued to finish this process.

After completion of the printing protocol control task 52, the process is moved to task dispatcher 526 again. The task dispatcher 526 selects the second drawing task 53 for the new printing protocol as a next execution task and starts this process.

In the second drawing task 53, after initializing various parameters at a step 531, a document data process 532 is repeated in the same manner as the first drawing task 51. The process in the second drawing task 53 is carried out in the same manner as the first drawing task 51 except that the printing protocol is different.

In the process shown in FIG. 5, the following two particulars may be changed.

(1) Making a task creation macro and a task deletion macro unused by residing a task control block in a main memory:

(a) By residing a task control block (See again Japanese Patent Laid-Open Publication Nos. 63-158481 and 1-164637) for controlling tasks such as the drawing task all the time in the main memory, the use of the task deletion macro 522 and the task creation macro 523 can be deleted from the printing protocol control task 52.

(b) Further, in this instance, the command processing program corresponding to each drawing task is stored in either the main memory or the file part 16A. In this respect, there is no change in comparison with a case in which this change is not taken.

(2) Change of loading timing of a command processing program:

(a) The time at which the command processing program corresponding to the drawing task is loaded from the file part 16A to the main memory can be changed from the execution time of the task creation macro 523 to any of the followings:

(i) The execution time of the task start macro 524.
(ii) The execution time of the task dispatcher 526.

(b) The loading time change of (a) can be possible even when the task deletion macro 522 and the task creation macro 523 are not deleted.

(c) Further, even when the command processing program loading is carried out at any of the above-described three times, the following common operation in the loading process should be executed.

Loading Process Procedure:

(i) It is checked whether or not there exists the command processing program (referred to as program A hereinafter) to be loaded in the main memory.

(ii) If the program A is present in the main memory, the loading process is completed.

(iii) If the program A is absent in the main memory, it is checked whether or not there is a sufficient free area for storing the program A in the main memory.

(iv) If there is a sufficient free area in the main memory, the program A is loaded from the file part 16A to the main memory.

(v) If there is no sufficient free area in the main memory, after creating the sufficient free area in the main memory the program A is loaded from the file part 16A to the main memory.

In the second embodiment, as described above, since less capacity of the main memory of the printer controller 16a is sufficient as compared with that of the first embodiment, the cost of the printing system according to the present invention can be reduced. In this embodiment, of course, the same effects and advantages as those of the first embodiment can be obtained.

Figure 6:
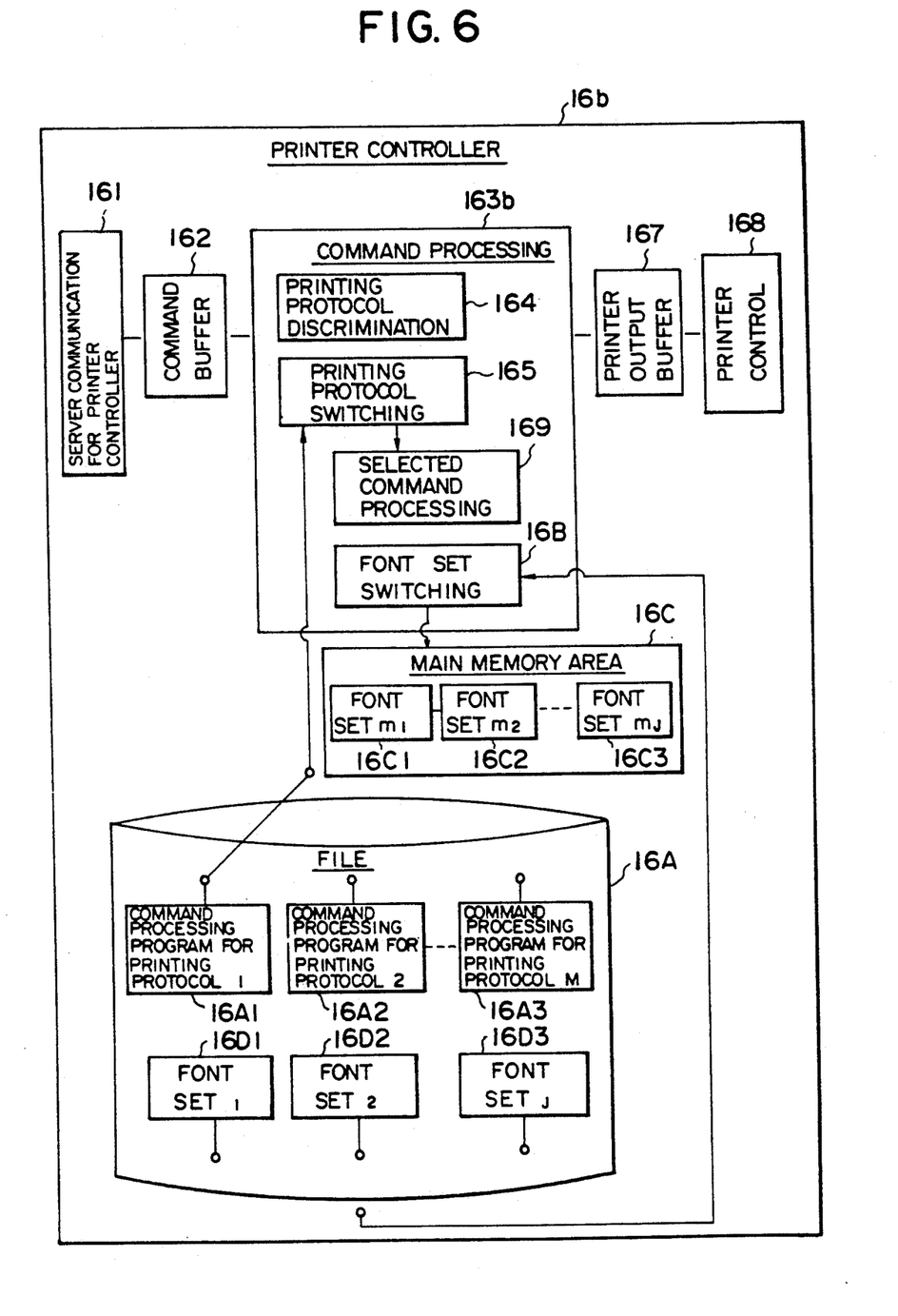
FIG. 6 is a block diagram of a further embodiment of a printer controller of a third embodiment of a printing system according to the present invention.

Referring next to FIG. 6, a third embodiment of a printing system according to the present invention, having the same structure as that of the second embodiment except a printer controller, will now be described in detail. In FIG. 6, there is shown a further embodiment of a printer controller of a print server in the printing system.

In this embodiment, the printer controller 16b has the same structure as the printer controller 16a of the second embodiment, except the followings:

(1) The file part 16A further stores a plurality of (J) font sets such as first, second to Jth font sets 16D1, 16D2 to 16D3.

(2) The printer controller 16b is further provided with a main memory font set area 16C for storing a plurality of (I) first, second to Ith font sets 16C1, 16C2 to 16C3.

(3) In this embodiment, under condition I<J, only a part (I) of the whole (J) font sets supported by the printer controller 16b is stored in the main memory of the printer controller 16b so as to save an installed capacity of the main memory for the font sets for reducing a cost of the printing system.

(4) The command processing part 163b further includes a font set switching part 16B for executing a font set designation command received from the server 15 to select one of the font sets within the printer controller 16b.

In this embodiment, a font set switching process by the font set switching part 16B in the printer controller 16b will now be described in connection with FIG. 7.

(a) In the font set switching process, a font set number n of a font set to be nest loaded in the main memory is used as an input parameter.

(b) In the font set switching process, first, it is discriminated whether or not there exists the font set n in the main memory font set area 16C in step 71. If there is the font set n in the main font set memory area 16C, the font set switching process is completed.

(c) If there is no font set n in the main memory font set area 16C, it is then discriminated whether or not there is a fixed size of sufficient free area for storing the font set n in the main memory font set area 16C in step 72.

(d) If there is a fixed size of sufficient free area in the main memory font set area 16C, the font set n is loaded in the fixed size of sufficient free area in the main memory font set area 16C. This loading means a copying the content of the font set n stored in the file part 16A to the fixed size of free area in the main memory font set area 16C in step 73.

(e) If there is no fixed size of sufficient free area in the main memory font set area 16C, the following steps 74, 75 and 76 are executed.

(i) A font set having a given number m least frequently used within the main memory font set area 16C is searched in step 74.

(ii) If necessary, the dot image extended for the font set m is unloaded in a save area for the font set m within the file part 16A in step 75. In this case, the extended dot image means the result obtained by performing dot extension of the font set m described by another expression format, other than a dot image format, to the dot image format wherein the font set m is described for example by outline information or image compression information of a font such as the outline font or the vector font. When the font set described by the another expression format other than the dot image format is used, the extended dot image is generated and is copied in the printer output buffer part 167 for carrying out the character drawing.

(iii) Then, the font set n is loaded in the area for the font set m in the main memory font set area 16C in step 76.

(f) Lastly, the parameter corresponding to the font set n is set as a parameter of a current font set that the command processing part 163b selects and uses at the time, in step 77. In this instance, as examples of the parameter for the current font set, 1) the font set number and 2) the head address of the font set n within the main memory font set area 16C can be given.

Figure 7:
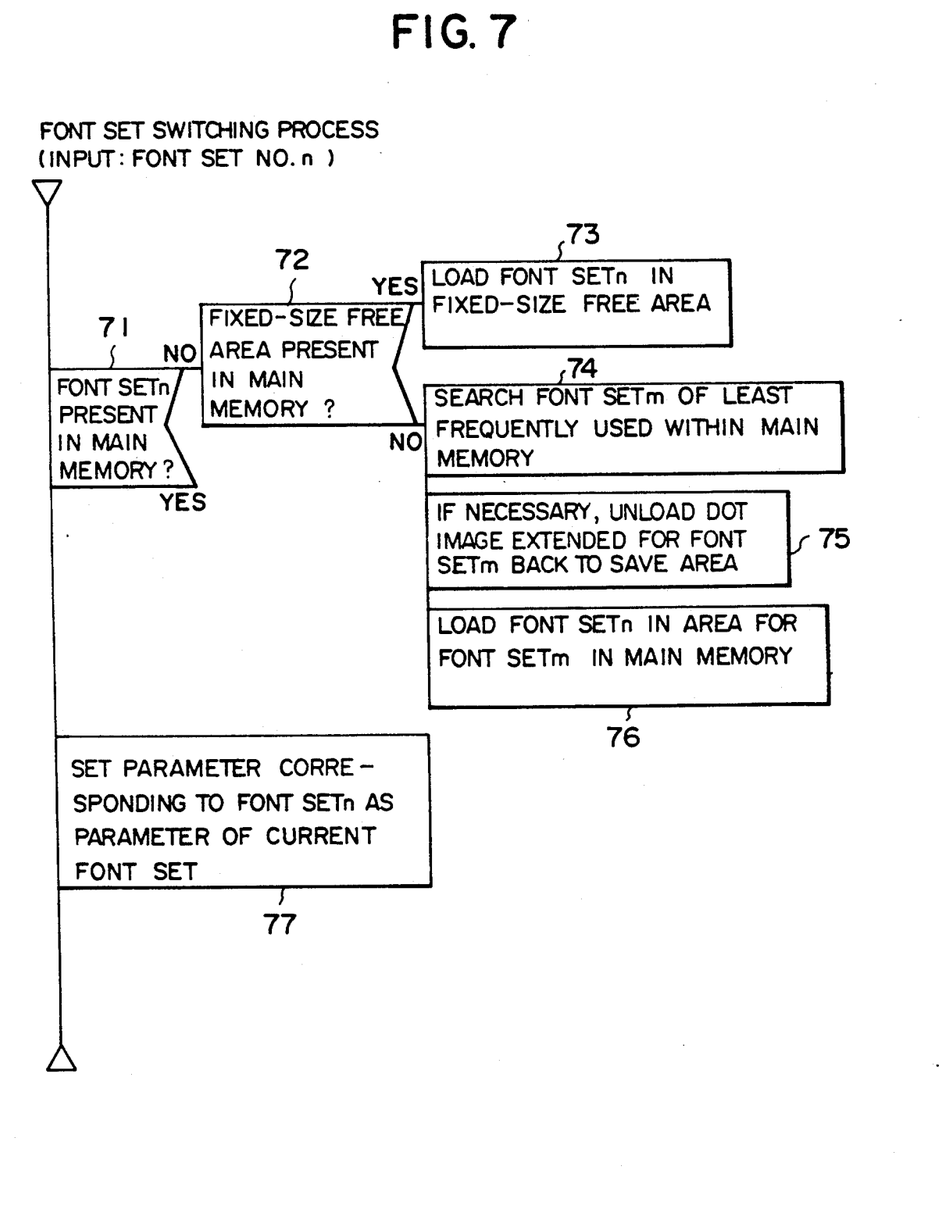
FIG. 7 is a schematic view for explaining a font set switch process in the printing system shown in FIG. 6.

In this embodiment shown in FIGS. 6 and 7, although the explanation has been carried out as if all font sets have the same fixed size, even when each font set has a different necessary memory size from another front set, 1) by using the necessary memory size of the font set having the maximum font size as the above-mentioned fixed-size, or 2) by allocating a series of unit memory buffers each having a small capacity to each font set to obtain and release the necessary number of unit memory buffers, the font set switching process can be carried out in the same manner as described above.

In this embodiment, as described above, the print server in the printing system of the present invention can support a plurality of font sets with a main memory having a small capacity.

Further, when a plurality of printing protocols are supported, the contents of the font sets supported must be often varied depending on each printing protocol. However, in this embodiment such a case can be also readily dealt with, and thus a print server having convenience in use can be provided.

Figure 8:
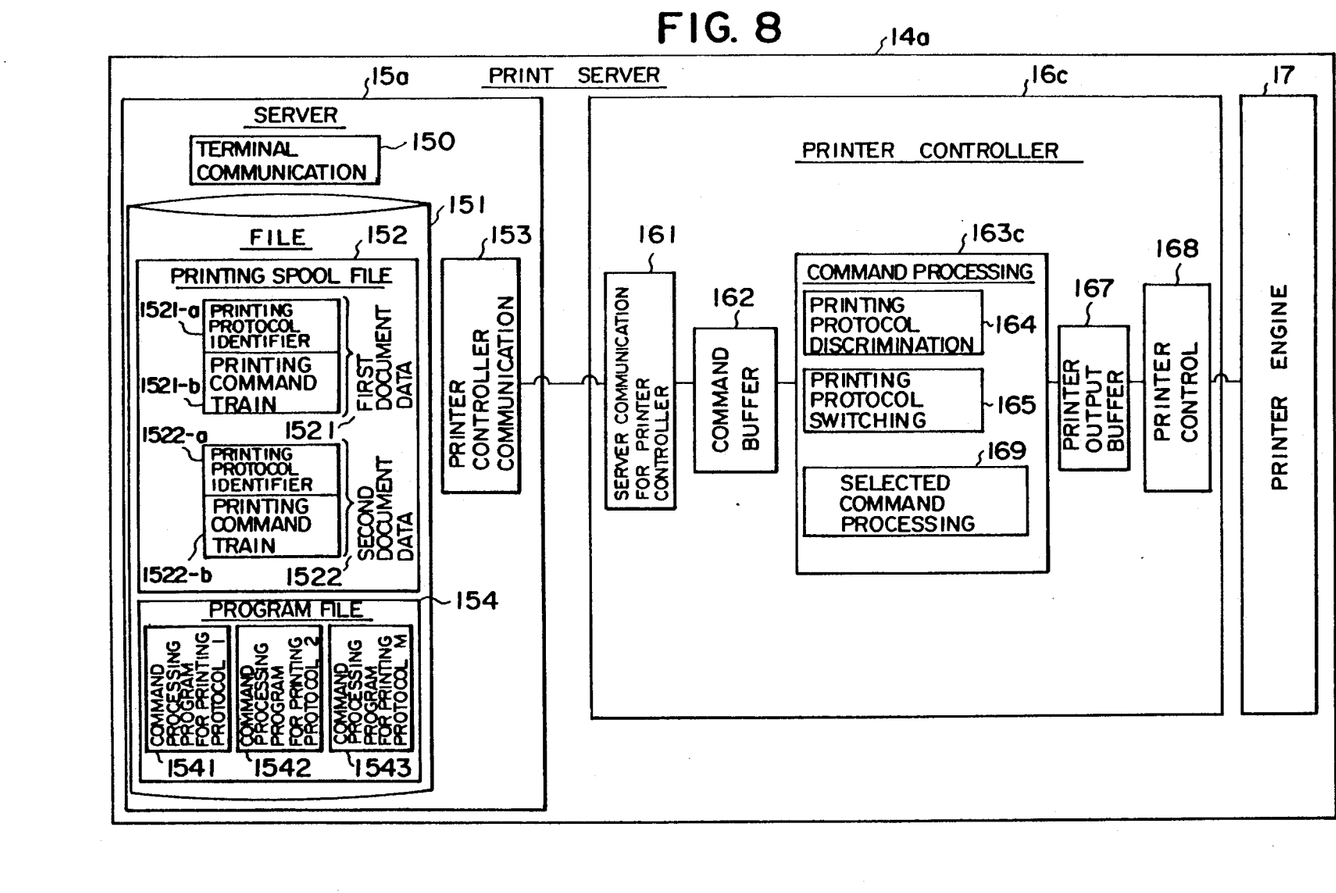
FIG. 8 is a block diagram of another embodiment of a print server of a fourth embodiment of a printing system according to the present invention.

Next, a fourth embodiment of a printing system according to the present invention, having the same structure as that of the second embodiment except a print server including a server and a printer controller, will now be described in detail. In FIG. 8, there is shown another embodiment of a print server 14a including another embodiment of a server 15a and still another embodiment of a printer controller 16c in the printing system.

In this embodiment, there are two structural features as follows.

(1) As shown in FIG. 8, the server 15a is further provided with a program file part 154 within the file part 151, for storing first, second to Mth command processing programs 1541, 1542 to 1543 for first, second to Mth printing protocols, in place of in the file part 16A in the printer controller 16a of the second embodiment.

(2) The command processing part 163c of the printer controller 16c includes a printing protocol discrimination part 164, a printing protocol switching part 165 and a selected command processing part 169.

In this embodiment the switching of the printing protocol is carried out as follows:

(1) The printing protocol identifier 1521a or 1522a at the head of the document data 1521 or 1522 is discriminated by the printing protocol discrimination part 164 in the command processing part 163c.

(2) On detecting that the printing protocol is changed to new one, the command processing part 163c activates the printing protocol switching part 165.

(3) The printing protocol switching part 165 requests the server 15a through the server communication part 161 of the printer controller 16c to transmit the command processing program for the new printing protocol n to the printer controller 16c, and moves to a waiting state for receiving the command processing program.

(4) The server 15a reads out one of the command processing programs 1541, 1542 to 1543 stored in the program file part 154, and transmits the requested one command processing program for the printing protocol n to the printer controller 16c through the printer controller communication part 153.

(5) The printer controller 16c receives the command processing program for the printing protocol n through the server communication part 161, and, after storing the received command processing program in the selected command processing part 169, releases the waiting state of the printing protocol switching part 165.

(6) The printing protocol switching part 165 completes its own process, and the command processing part 163a processes the document data read out of the command buffer part 162 to carry out the interpretation and execution of the printing commands by using the selected command processing program loaded in the selected command processing part 169 to obtain the printing data. The obtained printing data are sent to the printer output buffer part 167 and then are used for printing the document in the same manner as described above.

In this embodiment, a plurality of font sets 16D1, 16D2 to 16D3 stored in the file part 16A in the printer controller 16b of the third embodiment may be stored in the file part 151 of the server 15a so as to support the multi-fonts.

As described above, in this embodiment, the multiple printing protocols can be supported with a main memory having a small capacity, like that of the second embodiment, without providing a file part within the printer controller, and hence the cost can be further reduced to obtain a print server at a lower cost than those of the second and third embodiments.

In the preferred embodiments of the present invention, for the designation of the printing protocols and the font sets, the server combines the printing protocol identifier and printing commands with the document data and transmits the combined document data to the printer controller. However, such designation can be also performed by inputting the same from an operational panel mounted on the printer controller.

Then, a fifth embodiment of a printing system according to the present invention will now be described with reference to the FIGS. 2A and 2B to FIG. 8. In this embodiment, each of the terminals 11, 12 and 13 creates document data by using any one of a plural kinds of character codes and a printing is carried out for the created document data in the above-described first to fourth embodiments.

Examples of the supported character codes include the ASCII (American National Standard Code of Information Interchange), the JIS (Japanese Industrial Standard) code, the shift JIS code, the EBCDIC (Extended Binary Coded Decimal Interchange Code) and the like.

In this embodiment, the following features are added in the above-described first to fourth embodiments.

(1) Each terminal 11, 12 or 13 adds a character code identifier for identifying one of the character codes as well as a printing protocol identifier to document data by using the document data formation part 111, 121 or 131. The character code identifier is placed, preferably, in front of the printing protocol identifier in the document data. Then, each terminals 11, 12 or 13 transmits the created document data 18 to the print server 14 (or 14a) by using the server communication part 112, 122 or 132.

(2) In the print server 14, the server 15 (or 15a) transmits the received document data including the character code identifier, the printing protocol identifier and the printing commands to the printer controller 16 (16a, 16b or 16c).

(3) The printer controller 16 decodes the character code identifier of the received document data. If the character code identifier is of an initial value or a previous value (a value of a previous document data), after the printing protocol identifier is discriminated, the process is carried out in the same manner as that of the first to fourth embodiments.

(4) If the character code identifier is not the initial value nor the previous value, the command processing part 163 (163a, 163b or 163c) associated with the kind of the character code is selected, and the printer controller 16 continues the process. This selection based on the kind of the character code may be performed by any one of the following methods.

(a) A method of using character code conversion:

When the character codes are processed one by one, the character codes (belonging to a certain kind of character code) are converted into common character codes by referring to a conversion table. This character code conversion is performed by a character code conversion part added to the command processing part 163. Thereafter, the command processing part 163 executes the process by using the obtained common character codes.

(b) A method of replacing the character code processing part:

The command processing part 163 includes a plurality of character code processing parts for the different kind of character code. The character code processing parts are preferably composed of programs because of high extensibility. The character code processing parts are prepared in advance and are switched to one character code processing part corresponding to the kind of character code of the document data. This character code processing part switching is carried out by the following two methods.

(i) The command processing part 163 (preferably composed of a program owing to the high extensibility) is entirely switched to another based on the kind of character code.

(ii) The character code processing part of the command processing part 163 is formed with branch logics corresponding to the character code kinds to deal with the different kind of character code.

Further, the character code conversion in the foregoing method (a) may be carried out not in the printer controller 16 as described above but in the server 15. In this case, the server 15 decodes the character code identifier added to the document data and then converts the data into that written in a common character code set. The manners of the character code conversion may be the same as these employed in the printer controller 16. The document data written in the common character code set is sent to the printer controller 16 which in turn processes the document data in the same manner as described in the first to the fourth embodiments.

The case (i) is realized with a less program capacity or a less hardware (circuits) compared with the case (ii), but requires a supplementary processing such as the character code conversion, and hence it is liable to take a longer time than the case (ii).

(5) The printing protocols are roughly divided into the following two kinds:

(a) The printer control commands:

The print document, which are the printing commands in the document data above mentioned, is described as a string of character codes and control codes. The control codes are often described as escape sequences which extends the character codes. Most of conventional printers use this printer control commands. As typical examples of this, the PCL (Printer Command Language) of Hewlett Packerd Systems Company and the ESC/P of Epson Company are raised.

(b) Page description languages:

The print document is expressed as a program described by a program language. Typical examples of this include the PostScript of Adobe Systems Incorporated and Interpress of Xerox Company.

In the case (a), the control codes sometimes become the same codes (bit pattern) among a plurality of kinds of supported character code. In such a case, there is of no use to carry out the entire character code conversion in the command processing part 163 or the entire switching of the command processing part 163 as described in the above (4). It is sufficient to carry out the character code conversion or the switching of the command processing part for a part of the character drawing part.

In this embodiment, as described above, even when there are a plurality of kinds of character code supported as well as the printing protocols, the document data can be printed by a single print server. Hence, the cost performance of the print server can be largely improved.

Further, by adding all functions of the server to the printer controller 16, the functions of both the server 15 and the printer controller 16 are integrated to eliminate the server 15 and to realize a print server 14 having no server 15 in its hardware appearance. In this instance, the hardware of the server, such as the CPU, the main memory, the file part and so forth, can be eliminated, except a network control part (corresponding to the terminal communication part 150) of the LAN or WAN, and hence the cost of the print server 14 can be largely reduced.

Further, on the contrary, the printer controller 16 can be assembled in the server 15. In this case, for example, a printer controller board mounting the printer controller 16 thereon is directly connected onto an input/output bus of the server. In this case, a) a server communication part 161 and b) a file part 16A can be eliminated from the printer controller 16. In this instance, examples of a) the communication part include communication interface circuits such as the SCSI (Small Computer System Interface), the centronics interface, the RS-232C interface, Ethernet, Token-Ring and the like, and their driver programs.

In the print server 14 having this structure, the device can be reduced in its size and cost.

As described above, according to the present invention, even when a plurality of terminals of different kinds create document data by using different printing protocols and request the printing of the document data to a single print server having a printer controller, the printer controller discriminates printing protocol identifier of the received document data and carries out appropriate command processings corresponding to the printing protocol to perform the printing of the document. Therefore, a printing system having a high performance with respect to an invested cost can be provided.

Further, the multiple printing protocols and the multi fonts can be supported with a print server having a small memory capacity in a economical printing system of the present invention.

Furthermore, although, when a plurality of printing protocols are supported, the content of the supported font sets should be often changed corresponding to the printing protocols, according to the present invention, such a case can be also dealt with, and hence a print server having convenience in use can be provided.

Further, even when the character code types are different in addition to the printing protocols, the document data can be printed by a single print server. Hence, the cost performance of the print server can be largely improved.

Although the present invention has been described in its preferred embodiments with reference to the accompanying drawings, it will be readily understood that the present invention is not restricted to the preferred embodiments and that various changes and modifications can be made by those skilled in the art without departing from the spirit and scope of the present invention.

What is claimed is:

1. A printing system having a plurality of terminals and a print server connected via a network to the plurality of terminals such that the print server is shared by the plurality of terminals to print document data including a string of printing commands produced by the terminals, the printing system comprising:
    means, included in each of the plurality of terminals, for adding an identifier to the document data to be supplied to the print server, the identifier identifying a type of printing protocol thereof; and
    means, included in the print server, responsive to the identifiers, for converting different printing protocols of the plurality of terminals into a common printing protocol usable by the print server.

2. A printing system having a plurality of terminals and a print server connected via a network to the plurality of terminals such that the print server is shared by the plurality of terminals to print document data including a string of printing commands produced by the terminals, the printing system comprising:
    means, included in each of the plurality of terminals, for adding an identifier to the document data to be supplied to the print server, the identifier identifying a type of printing protocol thereof;
    means, included in the print server, for storing a plurality of command processing programs associated with different printing protocols of the plurality of terminals; and
    means, included in the print server, responsive to one of the identifiers, for selecting an associated one of the plurality of command processing programs.

3. The printing system of claim 2, wherein a part of a command processing program which is usable in common for the different printing protocols is shared by the plurality of command processing programs.

4. The printing system of claim 2, wherein said print server includes a secondary memory for storing the plurality of command processing programs associated with the different printing protocols, and a main memory for storing one of the plurality of command processing programs which is designated by the one identifier and read out of the secondary memory.

5. A printing system having a plurality of terminals and a print server connected via a network to the plurality of terminals such that the print server is shared by the plurality of terminals to print document data including a string of printing commands produced by the terminals, the printing system comprising:
    means, included in each of the plurality of terminals, for adding an identifier to the document data to be supplied to the print server, the identifier identifying a type of printing protocol thereof;
    a plurality of command conversion means, included in the print server, for converting command sets associated with different printing protocols of the plurality of terminals into a common command set usable by the print server; and
    selection means, included in the print server, for selecting one of the plurality of command conversion means in response to the identifier added to the document data which is received from one of the terminals.

6. The printing system of claim 1, wherein said print server includes a server having a file part for storing document data received from said plurality of terminals, a printer controller for processing the printing commands of the document data received from said server, and a printer engine for carrying out printing in response to an instruction from the printer controller, the printer controller including a secondary memory for storing a plurality of font sets and a primary memory for storing necessary ones of the plurality of font sets.

7. The printing system of claim 2, wherein said print server includes a server having a file part for storing document data received from said plurality of terminals, a printer controller for processing the printing commands of the document data received from said server, and a printer engine for carrying out printing in response to an instruction from the printer controller, the printer controller including a secondary memory for storing a plurality of font sets and a primary memory for storing necessary ones of the plurality of font sets.

8. The printing system of claim 5, wherein said print server includes a server having a file part for storing document data received from said plurality of terminals, a printer controller for processing the printing commands of the document data received from said server, and a printer engine for carrying out printing in response to an instruction from the printer controller, the printer controller including a secondary memory for storing a plurality of font sets and a primary memory for storing necessary ones of the plurality of font sets.

9. The printing system of claim 1, wherein said print server includes a server having a file part for storing document data received from said plurality of terminals, a printer controller for processing the printing commands of the document data received from said server, and a printer engine for carrying out printing in response to an instruction from the printer controller, a secondary memory being provided in said server for storing both plurality of command processing programs and a plurality of font sets such that the printer controller is allowed to receive from said server one of the plurality of command processing programs and one of the plurality of font sets.

10. The printing system of claim 1, wherein each of said plurality of terminals further comprises means for adding another identifier to the document data to be supplied to said print server, the another identifier identifying a type of character codes used in the terminals, and wherein said print server further comprising means responsive to the another identifiers for converting different sets of character codes of the plurality of terminals into a common set of character codes.

11. The printing system of claim 1, wherein each of said plurality of terminals further comprises means for adding another identifier identifying a type of character codes used in the terminals, and wherein said print server further comprising means for storing a plurality of character code processing programs associated with different sets of character codes and means responsive to the another identifiers for selecting an associated one of the plurality of character code processing programs.

* * * * *